Aug. 2, 1949.  C. W. MOTT  2,478,002
VALVE STRUCTURE MANIPULATABLE FOR CONTROLLING
DELIVERY OF FLUID AT SELECTIVE PRESSURES
Filed Dec. 31, 1943  2 Sheets-Sheet 1
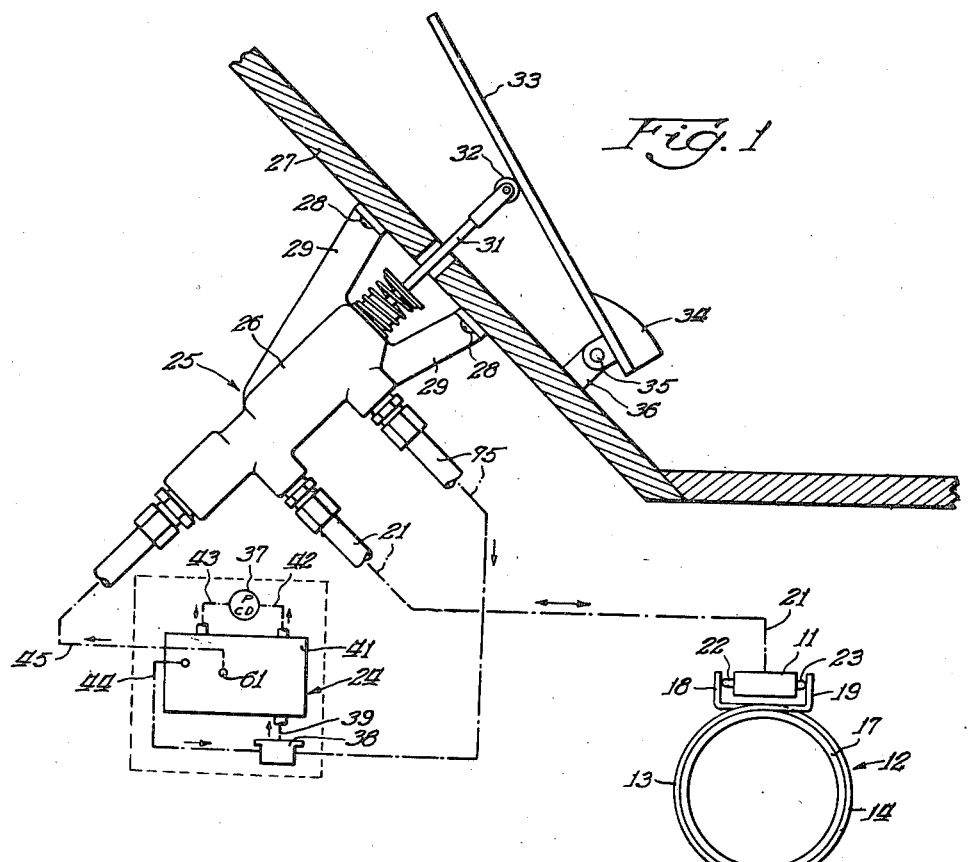
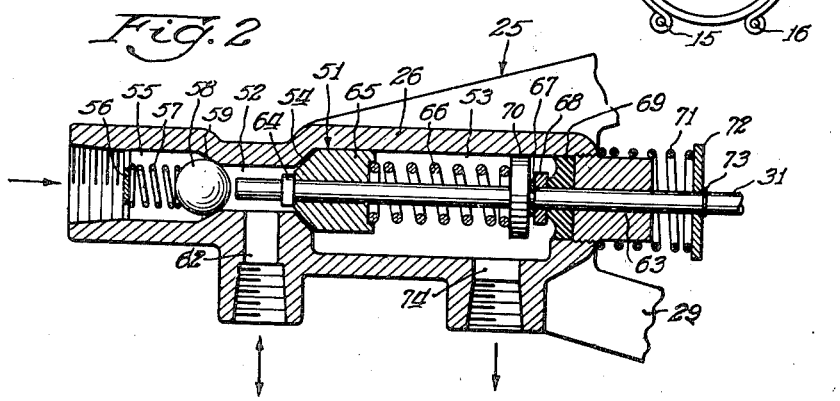
Inventor:
Carl W. Mott

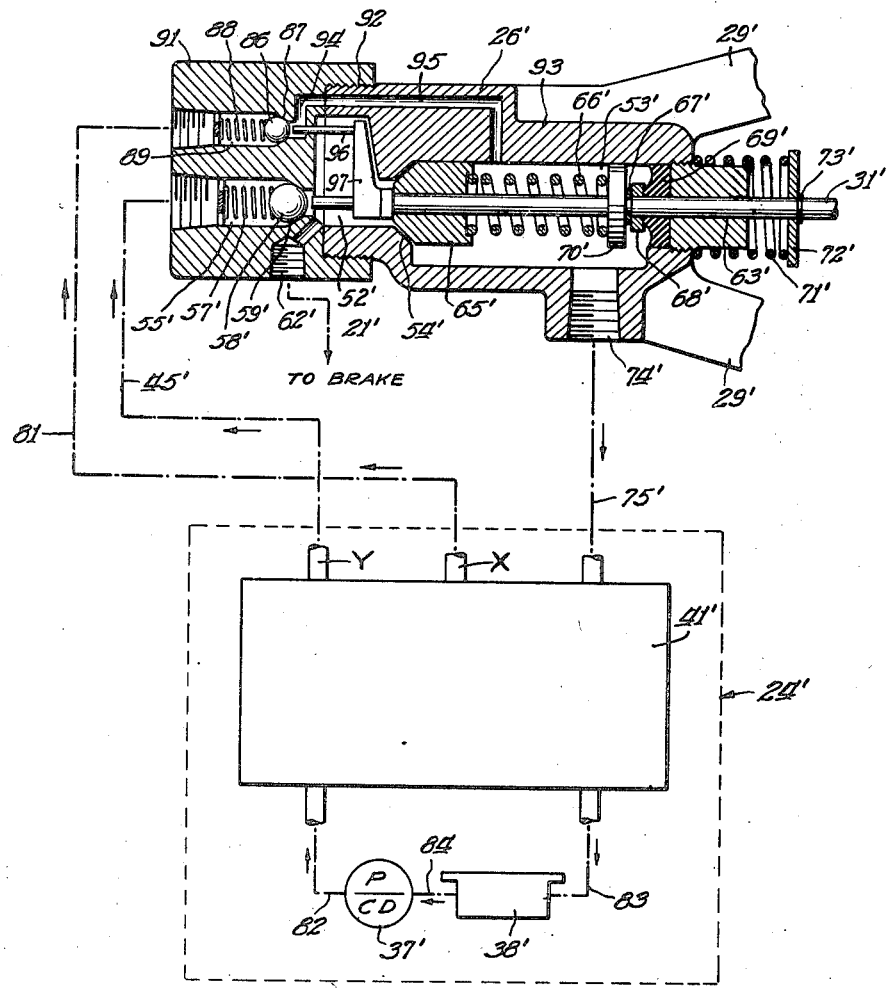

Patented Aug. 2, 1949

2,478,002

UNITED STATES PATENT OFFICE 2,478,002

VALVE STRUCTURE MANIPULATABLE FOR CONTROLLING DELIVERY OF FLUID AT SELECTIVE PRESSURES

Carl W. Mott, La Grange, Ill., assignor to International Harvester Company, a corporation of New Jersey Application December 31, 1943, Serial No. 516,467

4 Claims. (Cl. 60—52)

This invention has to do with a manually operable control system for a hydraulic brake and relates more particularly to such a control system, including a valve structure which functions to cause application of fluid pressure from a source of pressure fluid into a brake applying motor with an actuating force correlated in magnitude with the degree of advancement of a manually manipulated control member.

I am fully aware that the prior art discloses arrangements in which a manually advanceable valve control member regulates the application of pressure fluid from a source of such fluid in its application of pressure into a brake applying motor, causing that motor to apply the brake with a force constituting a function of the control member advancement. One form of such a prior art device is disclosed in a brochure entitled "Maintenance Manual," published by the Bendix-Westinghouse Automotive Air Brake Company of Pittsburgh, Pennsylvania, and having an identification insignia "B-W 1027 10M 1-38" and a copyright notice for the year 1938.

The disclosure in said brochure, which is most closely related to the present invention appears in Figure 64 on page 33. The disclosure in said Figure 64 has to do with an air brake control valve including a valve control member advanceable by a foot pedal for causing the application of compressed air pressure to brake chambers from a fluid pressure reservoir in accordance with the degree of advancement of said valve control member. Said valve arrangement is designed to contain a double valve arrangement, necessarily critical in adjustment, for terminating connection between the reservoir and the brake chamber while preventing communication between said brake chamber and an exhaust port for maintaining, in the brake chamber, the pressure incurred in proportion to advancement of the valve control member.

An object of the present invention is the provision of an improved control valve structure operable to cause a selectively variable fluid pressure to be applied to a brake chamber or motor while permitting regulated circulation of the fluid through the valve structure, between outlet and inlet sections of the pressure fluid source, and said valve structure including means operable upon retraction of its valve control member to condition the pressure fluid source so that it by-passes fluid at low pressure from a constantly driven pump contained therein. By this arrangement, the present valve structure is adapted to be made with an extreme simplicity and design, and to contain rugged parts of which the tolerance and the dimensions in their adjustment are not greatly critical.

The above and other desirable objects, more specific in nature, encompassed by and inherent in the invention, will become more readily apparent upon reading the ensuing description with reference to the annexed drawings wherein:

Figure 1 is a view, partly diagrammatic, illustrating a braking system constructed according to the principles of this invention and showing the improved valve structure in side elevation attached to the underside of one of the floor boards in a conventional driver's compartment of a passenger motor car;

Figure 2 is a sectional view taken upon a plane extending axially through the valve structure (shown in Figure 1), and Figure 3 is a view similar to Figure 1, but illustrating a system operating upon a modified principle and showing a modified valve structure in longitudinal section.

With continued reference to the drawings, and particularly to Figures 1 and 2, a preferred form of the invention is there illustrated in a motor vehicle installation for supplying the brake actuating fluid to the motor or brake chamber 11 of a diagrammatically represented brake 12, the brake consisting of a pair of curved brake elements 13 and 14 pivoted to fixed pivoted members 15 and 16, and pressable into frictional engagement with the periphery of a brake drum 17 upon the energization of the motor 11 for applying opposite outward force to lugs 18 and 19 at the upper ends of the brake elements. Movable piston members (not shown) are within the motor 11 and when fluid under pressure is introduced into the motor through a conduit 21 into the space between said piston members (not shown), extensions 22 and 23 upon the outer ends of said pistons will be moved oppositely outwardly for applying the aforesaid force to the lugs 18 and 19.

Fluid under pressure for selective application to the brake motor 11, through the conduit 21, is derived from a source 24 diagrammatically illustrated within the dotted line field in the lower left hand portion of Figure 1. Said source 24 and the delivery of fluid therefrom is controlled by a valve structure 25 of which the casing 26 is secured to the underside of a vehicle driver's compartment floor-board 27 by means of fastening devices 28 inserted through brackets 29 formed integrally with the casing. Regulation of the valve structure is accomplished by axial movement of a control member 31 thereof, which extends upwardly through the floor-board 27 where it presents an antifriction roller 32 in contiguity with a foot pedal 33 having a heel rest 34 for the operator of the vehicle, pivotally mounted at 35 upon a bracket 36 secured to a floor-board 27.

The pressure fluid source 24, while shown diagrammatically in Figure 1, is fully disclosed and claimed in my copending application Serial No. 486,656, now Patent No. 2,420,554. Briefly, the apparatus in source 24 includes a constant delivery pump 37 driven from some constantly rotating part of the vehicle engine. During the normal low pressure operation of the apparatus 24, fluid is taken into the pump 37 for a reservoir 38 from which it is drawn through a conduit 39, a channel (not shown) in the casing of a pressure regulating device 41 and a conduit 42. This fluid is discharged from the pump through a conduit 43 into the pressure regulating device casing and passes a by-pass valve (not shown) from which the fluid emerges through a conduit 44 for delivery back to the reservoir 38. During this by-pass operation of the apparatus 24, the valve structure 25 serves to prevent the escape of fluid from the pressure regulating device 41 through a delivery conduit 45, whereby the device 41, for reasons fully explained in said Patent No. 2,420,554, is caused to operate in the by-pass condition in which the pump 37 circulates the fluid to and from the reservoir at low pressure. Upon manipulation of the valve stem 31, however, for conditioning the valve structure 25 for permitting the discharge of fluid through the delivery conduit 45, as will be presently explained, a drop in fluid pressure within a section (not shown) of the pressure regulating device 41 will occur, terminating the by-pass condition and causing fluid delivered into the device 41 from the pump through the conduit 43 to be discharged at high pressure through the delivery conduit 45. The apparatus 24 operates virtually instantaneously in conversion from the low pressure by-pass condition to the high pressure fluid delivery condition, subsequent to the initial drop in fluid pressure incurred in the delivery conduit 45 by the manipulation of a valve control member 31.

Referring now to the valve casing 26, and more particularly to Figure 2 where the interior of such casing is visible, a chamber 51 therein is comprised of an inlet chamber portion 52 and an exhaust chamber portion 53. A connecting passage 54 between these chamber portions is in the form of a valve seat. The port 55 for the inlet chamber 52 contains a spider 56 which serves as a reaction member for a spring 57 which presses against a ball 58 for normally maintaining the latter against a valve seat 59 to preclude connection between the inlet port and the inlet chamber. The conduit 45 (Figure 1) is connected between the inlet port 55 and a fluid delivery port 61 of the pressure regulating device 41.

Also connecting with the valve inlet chamber portion 52 is a brake port 62 which (as shown in Figure 1) is connected by the brake conduit 21 with the fluid actuated motor 11 of the brake.

The right end of the exhaust chamber 53 contains an opening 63 for the valve operating member or stem 31 for axial movement therein. The left end of the valve stem 31 projects into the inlet chamber portion 52 where it is provided with an enlargement 64 which serves as a stop for a valve member 65, which is axially slidable upon the member 31 and which is normally held against the stop 64 by a spring 66 which reacts against a collar 70 which is held against movement to the right on member 31 by a snap ring 67. A spacer collar 68, adjacently to the snap ring 67, is abuttable against a sealing member 69 for limiting endwise movement of the operating member 31 to the right by a spring 71 which reacts against the casing, and a washer 72 which is constrained against endwise movement on the member 31 by a snap ring 73.

A fluid return port 74 communicates with the exhaust chamber 53 and is connected by a fluid return conduit 75 with the reservoir 38 of the fluid source 24.

*Operation of the system shown in Figures 1 and 2*

With the parts in the positions illustrated in Figures 1 and 2, the brake motor 11 is deenergized, that is, not subjected to fluid pressure, and the brake 12 is released. Since the valve ball 58 is against its seat 59, fluid cannot escape through the delivery port 61 of the pressure regulating device 41 for delivery through the conduit 45. As a consequence, the constant delivery pump 37 simply circulates the fluid at low pressure through the conduit 43, into the pressure regulating device 41, outwardly of the device through conduit 44 into the reservoir 38, from the reservoir through conduit 39 into a section of the device 41 and thence to the pump through conduit 42. This condition will prevail so long as the valve 58—59 is closed.

When it is desired to cause engagement of the brake 12, the operator will depress the brake pedal 33, thereby axially advancing the brake operating member 31 and projecting the left end of this member (shown in Figure 2) against the ball 58 for opening the valve 58—59. This advancement of the control member 31 is opposed by the spring 71 and subsequent to the abutment of the valve member 65 with its seat 54, advancement of such member 31 is also opposed by the spring 66. Pursuant to the opening of the valve 58—59, fluid will escape from the pressure regulator port 61 through the conduit 45, valve port 55 in the chamber 52, brake port 62 and brake conduit 21 into the brake motor 11. The fluid initially issuing from the port 61 of the pressure regulating device 41 flows from a reservoir (not shown) in said device where the fluid is stored at high pressure. Upon enough fluid issuing through the port 61 for predeterminedly depleting the fluid in such reservoir in the device 41 and incurring a corresponding predetermined drop in pressure, the device 41 operates automatically for terminating the by-pass condition and for causing the pump 37 to force fluid directly into the reservoir at high pressure. Therefore, so long as the fluid is withdrawn from the device 41 through the delivery port 61, the constant delivery pump 37 will be operable, in conjunction with the device 41, for maintaining a high pressure condition in the fluid issuing from the port 61 into the conduit 45 for impression upon the brake motor 11. It is desired, of course, that the pressure of fluid in the brake motor 11 shall be regulatable in magnitude according to the degree of depression of the brake pedal 33, or the advancement of the control member 31, so that the force with which the motor 11 causes the brake 12 to be engaged will be according to the amount of depression of the brake operating pedal, according to conventional practice.

While valve 58—59 is maintained in the opened condition by the valve stem 31, the force with which the valve member 65 is urged into engagement with the seat 54 will be a function of the amount that the spring 66 is compressed. When the valve stem 31 is advanced far enough to slightly unseat the ball 58 for causing the introduction of fluid into the inlet chamber 52, the spring 66 will be compressed but slightly in addition to its preloading compressed condition between the members 65 and 70, so that fluid within the inlet chamber 52 can escape into the exhaust chamber 53 over the valve seat 54 by slightly displacing the valve member 65 to the right. The pressure within the inlet chamber 52 and, therefore, in the conduit 21 and in the brake motor 11 will correspond to the pressure required in the chamber 52 for compressing the spring 66 incident to moving the valve member 65 far enough to permit by-pass into the exhaust chamber 53 of the fluid received at a constant rate from the source 24, into said chamber 52 past the valve 58—59. When the brake pedal 33 is depressed only a slight distance, the spring 66 will be compressed a relatively slight amount by the movement of the collar 70 to the left, and consequently, the pressure attainable in the inlet chamber portion 52, controlled by the by-pass over the valve seat 54, will be slight. The pressure with which the brake 12 is engaged will be correspondingly slight. When it is desired to increase the force with which the brake 12 is applied, the operator will depress the brake pedal 33 a greater distance, whereby the collar 70 is advanced farther to the left to increase the force with which spring 66 urges the valve member 55 seated and correspondingly increases the pressure required in the chamber portion 52 for causing the excess fluid to escape over the valve seat 54. The pressure applied to the brake motor and the force with which the brake 12 is applied is correspondingly increased. Meanwhile, the fluid escaping into the exhaust chamber portion 53 is discharged through the exhaust port 74, through the conduit 75 to the reservoir 38 for recirculation in the system.

If, after depressing the brake pedal 33 a distance which causes the brake 12 to be engaged with a comparatively great force, it should be desired to apply the brake with less force, this is accomplished conventionally by releasing the brake pedal 33 a desired amount so that the spring 71 can retract said brake pedal and the valve control member 31, (this retraction also being aided by the spring 66) whereby the spring 66 permits the valve member 65 to be unseated sufficiently for allowing the excess fluid to escape from the chamber inlet portion 52 at a lower pressure.

When it is desired that the brake should be completely released, the brake pedal 33 will be released by the operator so that the spring 71 becomes effective for returning the valve member 65 to the position shown in Figure 2, whereby there is a connection of the brake motor 11 with the low pressure reservoir 38, through the conduit 21, brake port 62, inlet chamber portion 52, valve seat passage 54, chamber portion 53, fluid return port 74, and the fluid return conduit 75. The brake will be completely released, therefore, when the pedal 33 is released. Complete release of the pedal 33 also permits the valve ball 58 to seat and terminate the discharge of fluid from the pressure regulating device 41, through its delivery port 61, whereby the high pressure condition within the reservoir in the device 41 is reestablished for again incurring the by-pass condition of the fluid source apparatus 24.

*Figure 3 embodiment*

The hydraulic brake control system, shown in Figure 3, while differing somewhat from that shown in Figures 1 and 2, employs many parts which are identical with or correspond to parts in the embodiment in Figures 1 and 2, and these parts to expedite the disclosure are designated by the same reference characters with the addition of a prime exponent. A first difference of this second embodiment is in the source of pressure fluid. This source, 24', of the pressure fluid employs a constant delivery pump 37' and a reservoir 38', together with a modified form of a pressure regulating device 41' of which the structural details and arrangement are clearly set forth in said Patent No. 2,420,554. Said pressure regulating device 41', excepting when fluid can escape therefrom through port X and a control conduit 81, is operable to by-pass the fluid received from the pump 37' at low pressure. During low pressure by-pass, the fluid from the pump enters the pressure regulating device through a conduit 82 and after passing through a by-pass valve (not shown) in the device 41', the fluid emerges at low pressure through a conduit 83 from which it is discharged into the reservoir 38' preparatory to delivery to the pump through a conduit 84. Fluid entering the pressure regulating device 41', through a conduit 75', passes directly through the device to the conduit 83 for delivery to the reservoir. During high pressure operation of the apparatus 24', upon the termination of the by-pass condition through the pressure regulating device 41', fluid is delivered through a port Y and a delivery conduit 45' at high pressure.

An auxiliary control valve is provided in the valve casing 26' for controlling the discharge of fluid through the control conduit 81, and thereby remotely controlling the pressure regulating device 41' so that it can be caused to deliver fluid through the conduit 45' at high pressure when the auxiliary control valve permits the escape through the conduit 81, and for terminating such delivery of fluid at high pressure through the conduit 45' when the auxiliary control valve terminates the discharge of fluid through the control conduit 81.

Such auxiliary control valve in the valve casing 26' includes a ball 86, normally held against a seat 87 by a spring 88. This valve 86—87 is disposed within a control inlet port 89 formed in a section 91 of the casing 26', which is screw threaded at 92 to a section 93 of said casing. A channel 94 on the right side, or delivery side, of the valve 86—87 communicates with a channel 95 in the casing portion 93 and thence with the exhaust chamber 53'. The valve ball 86 is adapted to be unseated by the projection to the left of a pin 96, carried by an arm 97 which is fixed upon the valve stem 31'. The left end of the valve stem is abuttable against the valve ball 58' for controlling the valve 58'—59' in the manner hereinabove described with respect to the valve 58—59.

Operation of the Figure 3 embodiment

In Figure 3, the valve stem 31' is shown in its retracted position, that is, in its rightmost position wherein the valves 86—87 and 58'—59' are closed and valve 54'—65' is held open so that the brake motor is connected to the low pressure zone within the exhaust chamber portion 53' through the brake port 62' in the chamber portion 52', and said valve 54'—55'. Upon movement of the valve stem 31' to the left for causing engagement of the brake, the valve operating pin 96 will first engage the ball 86 for opening the valve 86—87, thus permitting the escape of fluid from the control device 41' through the conduit 81, past said valve 86—87 and through the channel portions 94 and 95 into the exhaust chamber portion 53'. When this occurs, the pressure regulating device 41' becomes effective for delivering fluid. The entire output of the pump 37' is then introduced into the device 41' at high pressure, there being a pressure relief valve (not shown) in the device 41' for permitting escape of fluid under high pressure from the pump into the conduit 83' when such fluid cannot pass through the conduit 45' and the valve 58'—59' at all or only at a slow rate because of such valve being closed or only partly open. Imposition of pressure upon the brake motor 11 does not occur until the valve stem 31' has been advanced to the left far enough for opening the valve 58'—59', although this valve is opened almost simultaneously with the control valve 86—87. Subsequent to the opening of the valve 58'—59', the pressure within the chamber portion 52', and hence in the conduit 21' leading to the brake, is controlled by the degree of advancement of the stem 31' and the correlated pressure of the spring 66' in a manner identical with that above described in the operation of the first embodiment. When the brake is to be released, the retraction of the valve stem 31' for accomplishing this effect will result in the valves 58'—59' and 86—87 being closed, and the closure of the latter valve in terminating escape of fluid through the control conduit 81 will reestablish the low pressure by-pass condition in the actuating fluid source 24'.

Having thus described two embodiments of the invention with the view of clearly disclosing the principles thereof, I claim:

1. In a valve structure for use in a hydraulic brake motor control system including a pressure-responsive fluid source operable to supply fluid under pressure from a delivery port thereof when fluid is withdrawn from a control port thereof and also operable to by-pass the fluid from the delivery port at low pressure into an inlet section of such source upon cessation of said withdrawal: the combination of a casing containing a chamber having inlet and exhaust portions with a connecting passage therebetween, an inlet port communicative with the chamber inlet portion and for communicative connection with the delivery port of said source, an inlet control port communicative with the exhaust chamber portion and for communicative connection with the control port of said source, a brake port communicative with the inlet chamber portion and for communicative connection with said brake motor to apply operating pressure thereto by means of a fluid column in such connection, and a fluid return port in the exhaust chamber portion for communicative connection with the fluid source inlet section; a normally closed control valve disposed between said control port and the exhaust chamber portion to control communication therewith; a pressure regulating valve in said connecting passage and operable to oppose the flow of fluid from the inlet chamber portion into the exhaust chamber portion in accordance with a regulating pressure applied to said valve; a valve control member advanceable to open said control valve and to maintain the same open while so advanced; and pressure applying means operated by such control member to apply said regulating pressure to the regulating valve in a magnitude increasing as a function of the control member advancement.

2. The combination set forth in claim 1, wherein there is also an inlet valve disposed between said inlet port and the inlet chamber portion to control communication therebetween, and such inlet valve being subjected to said valve control member to be opened thereby pursuant to said advancement of said control member.

3. In a valve structure for imposing pressure fluid from a source thereof into a fluid-driven motor for actuating the same; a valve casing containing inlet and exhaust chamber portions having a pressure-relief channel communicating therebetween, a fluid inlet channel for receiving pressure fluid from said source, said inlet channel being communicative with the inlet chamber portion and being disposed oppositely therein from and in coaxial relation with said pressure-relief channel, and a motor port communicative with said inlet chamber portion; inlet valve means in said inlet channel comprising a valve seat facing generally oppositely from the inlet chamber portion and a valve member normally upon said seat to preclude communication through said channel of the source with said inlet chamber portion but said valve member being unseatable to establish such communication; a pressure-relief valve comprising a seat circumscribing said pressure-relief channel and facing generally toward the exhaust chamber portion and a valve member removably seatable upon said seat; a valve stem extending through said chamber portions, said pressure-relief channel and said pressure-relief valve member; a stop on said valve stem between the pressure-relief valve member and the inlet chamber portion; a spring reaction member on said valve stem in the exhaust chamber portion and in spaced axial relation to the pressure-relief valve member; a spring disposed about said valve stem between said reaction member and the pressure-relief valve member urging the latter toward said stop; and spring means urging said valve stem in an axially retroactive direction for causing said stop to withdraw the pressure-relief valve member from its seat; and said valve stem being axially advanceable for compressing the spring thereabout to press said pressure-relief valve member toward its seat and abuttable against the inlet valve member for displacing the same from its seat.

4. In a valve structure; a casing containing inlet and exhaust chamber portions, a pressure-relief channel extending communicatively between said chamber portions, a fluid inlet channel communicative with the inlet chamber portion and being disposed therein oppositely to said pressure-relief channel and parallel therewith, a control fluid channel communicative with said exhaust chamber portion and being disposed oppositely of the inlet chamber portion from the pressure-relief channel and parallel therewith, and a motor port communicative with said inlet chamber portion; inlet valve means in said inlet channel comprising a valve seat facing generally oppositely from the inlet chamber portion and a valve member normally upon said seat to preclude communication inwardly through such channel into said inlet chamber portion; control valve means in said control channel comprising a valve seat facing generally oppositely from the inlet chamber portion and a control valve member normally upon such seat to preclude communication inwardly through such channel into the exhaust chamber portion; a pressure-relief valve comprising a seat circumscribing said pressure-relief channel and facing generally toward the exhaust chamber portion and a valve member removably seatable upon said seat; a valve stem extending through said chamber portions, said pressure-relief channel and said pressure-relief valve member; a stop on said valve stem between the pressure-relief valve member and the inlet chamber portion; a spring reaction member on said valve stem in the exhaust chamber portion and in spaced axial relation to the pressure-relief valve member; a spring disposed about said valve stem between said reaction member and the pressure-relief valve member urging the latter toward said stop; and spring means urging said valve stem in an axially retractive direction for causing said stop to withdraw the pressure-relief valve member from its seat; and said valve stem being axially advanceable for compressing the spring thereabout to press said pressure-relief valve member toward its seat and being concurrently operable to transmit unseating force to the said seated members of the inlet and control valve means.

CARL W. MOTT.

REFERENCES CITED

The following references are of record in the file of this patent:

UNITED STATES PATENTS

| Number | Name | Date |
|---|---|---|
| 1,635,221 | Pearson | July 12, 1927 |
| 2,281,138 | Christensen | Apr. 28, 1942 |
| 2,317,846 | Campbell | Apr. 27, 1943 |
| 2,392,421 | Stephens | Jan. 8, 1946 |
| 2,392,422 | Stephens | Jan. 8, 1946 |
| 2,404,529 | Reichelt | July 23, 1946 |